April 29, 1924.

C. A. BODDIE 1,492,198

ANTIHUNTING REGULATOR SYSTEM

Filed Aug. 26, 1919

WITNESSES:
H. B. Funk
W. B. Wells

INVENTOR
Clarence A. Boddie
BY
ATTORNEY

Patented Apr. 29, 1924.

1,492,198

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

ANTIHUNTING REGULATOR SYSTEM.

Application filed August 26, 1919. Serial No. 319,912.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Antihunting Regulator Systems, of which the following is a specification.

My invention relates to regulator systems and particularly to anti-hunting regulator systems.

One object of my invention is to provide a regulator system that shall operate in an efficient and in an effective manner and that shall be free from any so-called hunting action.

In operating regulators for maintaining constant current or constant voltage on a supply circuit, for maintaining the speed of a motor, or any other suitable machine, substantially constant and for other regulating problems, considerable trouble has been experienced in so operating the regulator in a steady and reliable manner as to prevent hunting action. In case no anti-hunting means is provided for governing the regulator, it is apparent that the moving parts of the regulator will be continually overtravelling to produce the so-called hunting action.

In a regulator constructed in accordance with my invention, the main control element of the regulator is operated directly in accordance with the operative condition of the circuit or machine to be regulated and is subjected to a reactive force which prevents any hunting action. In practicing my invention to maintain substantially-constant voltage on a supply circuit, a main control element is operated directly in accordance with the supply-circuit voltage for governing a motor that operates a rheostat to govern the excitation of a generator which is connected to the supply circuit.

The main control element embodies a main magnet which is operated directly in accordance with the supply-circuit voltage for operating the motor in a clockwise and in a counter-clockwise direction for varying the rheostat to increase and to decrease the supply-circuit voltage. The main control element also embodies an auxiliary electromagnet which is mechanically connected to the main magnet by any suitable means, such, for example, as a fluid connection, and which is energized in accordance with the excitation of the main generator for influencing the operation of the main magnet to prevent so-called hunting action.

Figure 1:
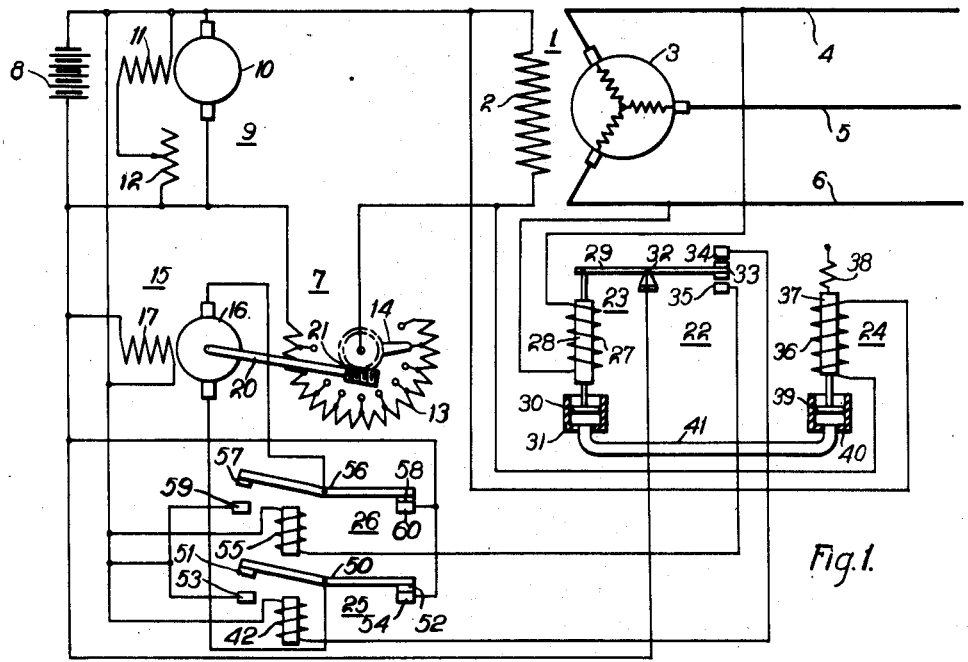
Figure 2:
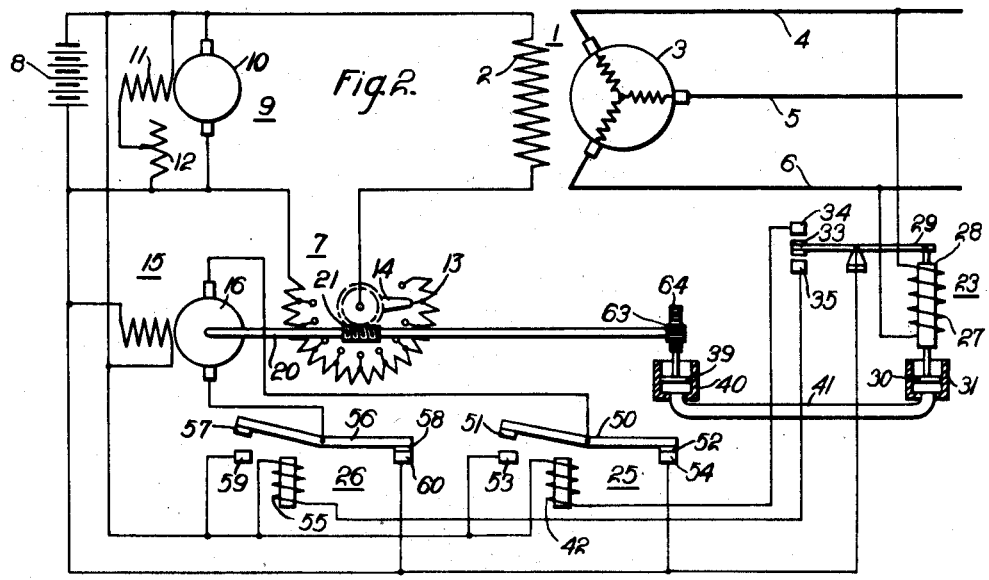
Figure 3:
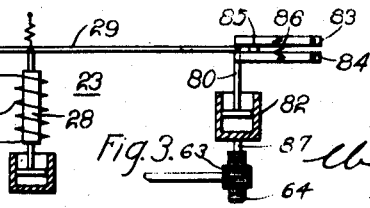

In the accompanying drawing, Figure 1 is a diagrammatic view of a regulator system constructed in accordance with my invention; Fig. 2 is a diagrammatic view of a modified regulator system, and Fig. 3 is a diagrammatic view of a portion of a modification of my invention.

Referring to Fig. 1 of the drawing, a main generator 1, comprising a field winding 2 and an armature 3, is directly connected to a supply circuit comprising conductors 4, 5 and 6. The field winding 2 of the main generator is connected, in series with a rheostat 7, to a source of constant voltage, such as a battery 8, and to an exciter generator 9. The exciter generator 9 comprises an armature 10 and a field winding 11 which is connected in series with an adjustable resistor 12.

The rheostat 7 comprises a resistor 13 which is governed by a rotatable arm 14 under the control of a motor 15. The motor 15 comprises an armature 16 and a field winding 17 which is connected across the battery 8 and the exciter 9. The armature shaft 20 of the motor 15 is directly connected to the rotatable arm 14 of the rheostat 7 in any suitable manner such, for example, as by the gearing 21.

A control element 22, comprising a main magnet 23 and an auxiliary magnet 24, is provided for operating two switches 25 and 26 in accordance with the voltage obtaining on the supply conductors 4, 5 and 6 to control the auxiliary motor 15 and, consequently, to control the rheostat 7 which governs the excitation of the main generator 1. The main magnet 23 comprises a winding 27 which is connected across the supply conductors 4 and 6 and a core armature 28 which is pivotally connected to a contact arm 29 and is provided with a piston 30 that operates within a cylinder 31. The contact arm 29 is fulcrumed at 32 and carries a main contact member 33 which engages contact members 34 and 35 in accordance with the operative position of the main magnet 23.

The auxiliary magnet 24 comprises a winding 36, which is connected across the generator field winding 2 in order to be energized in accordance with the generator excitation, and a core armature 37 which is supported by means of a spring member 38. The core armature 37 is provided with a piston 39 which operates within a cylinder 40. The cylinder 40, which is associated with the auxiliary magnet, is connected to the cylinder 31 which is associated with the main magnet 23 by a pipe 41 containing any suitable fluid in order that any operation of the auxiliary magnet may influence the main magnet to change its setting and prevent hunting action.

The switch 25 comprises a winding 42, which is connected across the battery 8 and the exciter generator 9 upon engagement between the main contact members 33 and 34, and a switch arm 50 carrying contact members 51 and 52 which engage contact members 53 and 54 in accordance with the operation of the switch. The switch 25 serves to connect the armature 16 across the battery 8 and the exciter generator 9 to effect clockwise rotation of the motor 15 for decreasing the effective resistance value of the rheostat 7 which is included in circuit with the generator field winding 2. Thus, upon engagement between the main contact members 33 and 34, the switch 25 is operated to rotate the motor 15 in a clockwise direction for increasing the main-generator excitation and, accordingly, for increasing the supply-circuit voltage.

The switch 26 comprises a winding 55 which is connected across the battery 8 and the exciter generator 9 upon engagement between the contact members 33 and 35, and a switch arm 56 carrying contact members 57 and 58 which engage contact members 59 and 60 in accordance with the operation of the switch. The switch 26 serves to connect the armature 16 in circuit with the battery 8 and the exciter generator 9 to effect rotation of the motor 15 in a counter-clockwise direction. The clockwise rotation of the motor 15 increases the resistance value of the rheostat 7 included in circuit with the field winding 2 to decrease the supply-circuit voltage.

In case the voltage on the supply conductors 4, 5 and 6 falls below normal value, the energization of the main magnet 23 is decreased for operating the contact arm 29 to effect engagement between the main contact members 33 and 34. Upon engagement between the contact members 33 and 34, the switch 25 is operated to effect clockwise rotation of the motor 15. Thereupon, the arm 14 of the rheostat 7 is moved in a clockwise direction to decrease the resistance included in the circuit of the field winding 2 and, accordingly, to increase the voltage of the generator which is supplied to the supply conductors 4, 5 and 6.

In case no anti-hunting means were provided for governing the operation of the main magnet 23, the contact members 33 and 34 would be maintained in engagement with each other for continuing the operation of the motor 15 and the rheostat 7 until normal voltage obtained upon the supply conductors 4, 5 and 6. Consequently, the motor 15 and the various moving parts of the regulator would overtravel to increase the voltage on the supply conductors 4, 5 and 6 above normal value. In order to prevent such overtravel on the part of the various moving parts of the regulator and of the motor 15, the auxiliary magnet 24 is operated to temporarily change the setting of the main magnet 23 and to effect separation of the main contact members 33 and 34 just prior to the obtaining of normal voltage conditions on the supply circuit. Thus, in the case under consideration, the energization of the auxiliary magnet 24 is increased in accordance with the increased energization of the field winding 2 to lower the piston 39 and to increase the pressure exerted on the piston 30 for changing the setting of the main magnet to permit the separation of the contact members 33 and 34 at a lower voltage than would be effected in case the main magnet were controlled solely by the supply-circuit voltage.

In case a voltage above normal value obtains on the supply circuit, the main magnet 23 operates the contact arm 29 to effect engagement between the contact members 33 and 35. Thereupon, the switch 26 is operated to energize the field winding 18 to effect counter-clockwise rotation of the motor 15. The contact arm 14 of the rheostat 7 is moved in a counter-clockwise direction to increase the resistance included in circuit with the field winding 2 to decrease the voltage of the generator 1 which is applied to the supply circuit. The decreased energization of the field winding 2 decreases the energization of the auxiliary magnet 24 to lower the pressure which is applied to the piston 30 of the main magnet 23. Consequently, the setting of the main magnet is changed to effect separation of the contact members 33 and 35 just prior to the obtaining of normal voltage on the supply conductors 4, 5 and 6.

Inasmuch as the system shown in Fig. 2 of the drawing is very similar to the system shown in Fig. 1 and differs solely in the means for preventing any hunting action on the part of the regulator, similar parts have been indicated by corresponding reference characters. In the system disclosed in Fig. 2 of the drawing, the auxiliary magnet 24 is substituted by a pinion 63 mounted on the motor shaft 20 for raising and lowering a rack 64 in accordance with the operation of the rheostat 7. The rack 64 is directly connected to the piston 39 which operates within the cylinder 40.

In case the voltage on the supply conductors 4, 5 and 6 is above or below normal value, the main magnet 23 selectively operates the switches 25 and 26 for operating the motor 15 and the rheostat 7 to govern the excitation of the field winding 2 and, accordingly, to govern the voltage of the generator 1 which is applied to the supply circuit. In order to prevent any hunting action, the piston 39 is operated directly by the motor shaft 20 in accordance with the operation of the rheostat 7 in place of being operated by an auxiliary magnet 24 in accordance with the energization of the field winding 2, as disclosed in Fig. 1 of the drawing. Thus, in case the main magnet 23 operates the contact arm 29 to effect engagement between the contact members 33 and 34 for increasing the voltage on the supply circuit, the piston 39 is lowered to so increase the pressure exerted on the piston 30 as to change the setting of the main magnet 33 and effect separation of the contact members 33 and 34 just prior to the obtaining of normal voltage on the supply circuit. In case of low voltage on the supply circuit, the piston 39 is raised for decreasing the pressure on the piston 30 to change the setting of the magnet 23.

In Fig. 3 of the drawing, a modification is shown wherein the contact arm 29 is controlled in the manner heretofore set forth by means of the main magnet 23. The arm 29 is pivotally connected to a piston 80 which operates within a cylinder 82. The opposite sides of the arm 29 are engaged by levers 83 and 84 and the levers are biased toward a stationary point 85 by means of a spring member 86. The levers 83 and 84 and the spring 86 serve to bias the contact arm 29 to a neutral position so that the contact member 33 is disengaged from the contact members 34 and 35.

A rod 87 which is directly connected to the cylinder 82, is preferably operated by the rack 64 which is shown in Fig. 2 of the drawing. Thus, the rack 64 serves to operate the contact arm 29 in a manner to oppose the initial operation of the arm 29 by the magnet 23 and prevent all hunting action.

Modifications in the system and arrangement and location of parts may be made within the spirit and scope of my invention, and such modifications are intended to be covered by the appended claims.

I claim as my invention:

1. In a voltage-regulator system, the combination with a supply circuit, a generator connected to the supply circuit and a rheostat for varying the generator excitation, of a motor for operating said rheostat to govern the supply-circuit voltage, means comprising a main magnet connected to the supply circuit for operating said motor to maintain substantially constant supply-circuit voltage, and an auxiliary magnet energized in proportion with the generator excitation voltage and operating on the main magnet to prevent hunting action.

2. In a voltage-regulator system, the combination with a supply circuit and a generator connected to said circuit, of means governed by the supply circuit voltage for controlling the excitation of the generator to maintain substantially constant supply-circuit voltage, and means operated in accordance with the excitation voltage of the generator to anticipate fluctuations in the supply-circuit voltage for influencing the operation of said controlling means to prevent hunting action.

3. In a voltage-regulator system, the combination with a supply circuit and a generator connected to the supply circuit, of means comprising a magnet connected to the supply circuit for controlling the generator excitation to maintain constant supply-circuit voltage, and means controlled by the magnet and operating only in accordance with the generator excitation voltage to react on the magnet in anticipation of changes in the supply-circuit voltage to prevent hunting action.

4. In a voltage-regulator system, the combination with a supply circuit and a generator connected to said circuit, of automatic means for governing the excitation of said generator to maintain constant supply-circuit voltage, and means operated in accordance with the generator excitation voltage for reacting on said governing means to prevent hunting action.

5. In a voltage-regulator system, the combination with a supply circuit and a generator connected to said circuit, of means comprising a main magnet operated in accordance with the supply-circuit voltage for governing the generator excitation to maintain substantially constant supply-circuit voltage, an auxiliary magnet energized in proportion with the generator excitation voltage, and a mechanical connection between said magnets for influencing the main magnet in accordance with the operation of the auxiliary magnet to prevent hunting action.

6. In a regulator for governing a supply circuit, a main magnet operated in accordance with supply-circuit conditions, and an auxiliary magnet energized in proportion with the generator excitation voltage having a fluid connection with the main magnet and serving to prevent hunting action.

7. In a regulator system, the combination with a power circuit and a dynamo-electric machine connected thereto, of electroresponsive control means therefor having a neutral position, and electroresponsive means energized in proportion with the excitation voltage of said dynamo-electric machine and adapted to react upon said control means to prevent hunting action.

8. In a regulator system, the combination with a power circuit and a dynamo-electric machine connected thereto, of control means therefor comprising an electroresponsive device having a neutral position, a second electroresponsive device energized in proportion with the excitation voltage of said dynamo-electric machine, and a connection between said devices whereby the second device may react upon the first device to return the same to its neutral position whenever the first device is actuated.

9. In a regulator system, the combination with a power circuit and a dynamo-electric machine connected thereto, of electroresponsive control means therefor having a neutral position, and electroresponsive means operated in accordance with the excitation of said dynamo-electric machine to react upon said control means to prevent hunting action.

10. In a regulator system, the combination with a power circuit and a dynamo-electric machine connected thereto, of control means therefor comprising an electroresponsive device having a neutral position, a second electroresponsive device operated proportional to variations in the excitation of said dynamo-electric machine, and a connection between said devices whereby the second device may react upon the first device to return the same to its neutral position whenever the first device is actuated.

11. In a regulator system, the combination with a power circuit, a dynamo-electric machine connected thereto, and a source of excitation therefor, of means for varying the excitation of said machine comprising a motor operated rheostat, switches for determining the direction of rotation of said motor, electroresponsive means energized from said circuit and adapted to control the operation of said switches, electrical means adapted to be influenced by the operation of said rheostat and a connection between the two last-mentioned means whereby one of said means may react upon the other of said means.

12. In a regulator system, the combination with a power circuit, a dynamo-electric machine connected thereto, and a source of excitation therefor, of means for varying the excitation of said machine comprising a motor-operated rheostat, switches for determining the direction of rotation of said motor, electrical means energized from said circuit and adapted to control the operation of said switches, electrical means adapted to be influenced by the operation of said rheostat and a yielding connection between said electrical means whereby one of said means may react upon the other of said means to prevent hunting action.

In testimony whereof, I have hereunto subscribed my name this 12th day of Aug., 1919.

CLARENCE A. BODDIE.